United States Patent
Resan et al.

(10) Patent No.: US 7,894,493 B2
(45) Date of Patent: Feb. 22, 2011

(54) ULTRASHORT SEED-PULSE GENERATING LASER WITH INTEGRAL PULSE SHAPING

(75) Inventors: Bojan Resan, Mountain View, CA (US); Estelle Coadou, Santa Clara, CA (US)

(73) Assignee: Coherent, Inc., Santa Clara, CA (US)

( * ) Notice: Subject to any disclaimer, the term of this patent is extended or adjusted under 35 U.S.C. 154(b) by 213 days.

(21) Appl. No.: 12/244,087

(22) Filed: Oct. 2, 2008

(65) Prior Publication Data
US 2010/0085994 A1    Apr. 8, 2010

(51) Int. Cl.
*H01S 3/10*    (2006.01)
(52) U.S. Cl. .......................................... 372/25
(58) Field of Classification Search ............... 372/25, 372/97, 18; 359/237
See application file for complete search history.

(56) References Cited

U.S. PATENT DOCUMENTS

| | | | | |
|---|---|---|---|---|
| 6,081,379 | A | 6/2000 | Austin et al. | 359/584 |
| 6,154,318 | A * | 11/2000 | Austin et al. | 359/584 |
| 7,430,071 | B2 * | 9/2008 | Resan et al. | 359/237 |
| 2004/0190567 | A1* | 9/2004 | Lutgen et al. | 372/25 |

OTHER PUBLICATIONS

T. Fuji et al., "Generation of smooth, ultra-broadband spectra directly from a prism-less Ti:sapphire laser," *Appl. Phys. B* (2003), vol. 77, pp. 125-128.

I. Pastirk et al., "No loss spectral phase correction and arbitrary phase shaping of regeneratively amplified femtosecond pulses using MIIPS," *Optics Express*, vol. 14, No. 20, Oct. 2, 2006, pp. 9537-9543.

G. Tempea et al., "Time-domain analysis of multilayer mirrors for ultrafast optics," *Optical Interference Coatings, OSA Technical Digest Series (Optical Society of America 2004)*, Paper ThA3, 3 pages in length.

A.M. Weiner, "Femtosecond pulse shaping using spatial light modulators," *Review of Scientific Instruments*, vol. 71, No. 5, May 2000, pp. 1929-1960.

L. Xu et al., "High-power sub-10-fs Ti:sapphire oscillators," *Applied Physics B (Lasers and Optics)*, vol. 65 (1997), pp. 151-159.

* cited by examiner

*Primary Examiner*—Minsun Harvey
*Assistant Examiner*—Patrick Stafford
(74) *Attorney, Agent, or Firm*—Morrison & Foerster LLP

(57) ABSTRACT

An ultrafast laser for delivering ultra-short duration seed-pulses for further amplification has a resonator including negative group delay dispersion (NGDD) mirrors for minimizing increases in the duration of the pulses due to positive group delay dispersion effects inherent in the resonator. The NGDD mirrors could be configured such that the pulses had a Gaussian spectrum. Instead, however, the NGDD mirrors are configured and arranged such the pulses have a non-Gaussian spectrum. The non-Gaussian spectrum has a FWHM bandwidth significantly greater than that of the Gaussian spectrum.

21 Claims, 4 Drawing Sheets

ULTRASHORT SEED-PULSE GENERATING LASER WITH INTEGRAL PULSE SHAPING

TECHNICAL FIELD OF THE INVENTION

The present invention relates in general to ultra-fast lasers. The invention relates in particular to lasers that are used to generate ultra-short seed-pulses for amplification in an optical amplifier.

DISCUSSION OF BACKGROUND ART

Ultrafast lasers are pulsed-lasers that deliver pulses having a duration as short as a few femtoseconds (fs). In many applications of such lasers, the shorter the pulse-duration the more effective the laser may be. Such lasers are frequently configured as master-oscillator power-amplifier (MOPA) systems in which a master laser provides a seed-pulse to an optical amplifier, usually a regenerative or multipass amplifier.

Typically the seed-laser delivers pulses having an essentially Gaussian temporal profile and an essentially Gaussian spectrum. The spectrum may have a bandwidth of between about 20 and 200 nanometers (nm). The lasers usually include mirrors that introduce negative group delay dispersion (NGDD) to light reflected therefrom. These mirrors minimize temporal broadening of the pulses due to positive group delay dispersion resulting from differences in velocity of the spectral components of the pulse.

In a paper "No loss spectral phase correction and arbitrary pulse shaping and arbitrary phase shaping of regeneratively amplified femtosecond pulses using MIIPS", J. Pastirk, B. Resan, A. Fry and J. Mackay, OPTICS EXPRESS 9543, 14, 20, (Oct. 2, 2006), it is taught that if the Gaussian spectrum of seed-pulses is "shaped" into a non-Gaussian form, by amplitude modulation, before being delivered to the amplifier, the duration of the amplified pulses will be less than had the spectrum not been so shaped.

FIG. 1 schematically illustrates in block-diagram form, the MOPA arrangement 10 described in the Pastirk et al. paper. In this arrangement, a pulse having an essentially Gaussian spectrum is delivered from a seed laser 12 to a pulse-shaping apparatus 14. The pulse-spectrum is amplitude modulated in a pulse shaper 14, then delivered to an amplifier 16 for amplification.

FIG. 2 schematically illustrates the essentially Gaussian spectrum of a pulse from laser 12 (dashed curve) and the spectrum of the pulse after shaping in pulse-shaper 14 (solid curve) and amplification in amplifier 16, with the spectra, here, being normalized. The shaped seed-pulse has two intensity-peaks with an intensity-trough between the peaks. The effect is that the shaped spectrum has almost twice the FWHM bandwidth of the original spectrum.

FIG. 3 schematically illustrates intensity as a function of time for amplified Gaussian-spectrum (dotted curve) and shaped-spectrum (solid-curve) pulses. The amplified spectrally-shaped pulse has a FWHM duration of 27.6 femtoseconds (fs) compared with a FWHM-duration of 35.6 fs for the amplified Gaussian-spectrum pulse. The spectral shaping has no effect on the amplified pulse energy.

In the pulse-shaper, a pulse-beam from the seed-pulse laser is caused to diverge in one transverse axis, for example, by passing the beam through a dispersive device such as a prism. The divergence is due to dispersion of the spectral components of the pulse by the prism. The diverging beam (spectrum) is collimated by a lens, or a concave mirror, and directed onto a one-dimensional spatial light modulator (SLM) located at a focal-length distance of the lens from the lens. This arrangement transforms the pulse from a time-domain to a wavelength-domain. The SLM is used to shape the spectrum by selectively attenuating selected wavelength-components of the spectrum. The shaped spectrum is then transformed back to the time domain by focusing the spectrum back onto the same or a different dispersive device. These operations require a relatively complex optical system particularly if the pulse-shaper has to optimally shape pulses of different spectral bandwidths.

Inclusion of such a pulse-shaper in a MOPA laser system can add significantly to the cost of the system. Many users of ultrafast MOPA systems are institutions such as not-for-profit foundations and universities. Such institutions often have limited budgets for capital equipment. Accordingly, it would be useful for such institutions if the above-discussed advantages offered by using spectrally-shaped seed-pulses in an ultrafast MOPA system could be enjoyed without a need for a pulse-shaper.

SUMMARY OF THE INVENTION

The present invention is directed to a laser for providing a light pulse for delivery to an optical amplifier. In one aspect of the invention a laser comprises a laser resonator terminated by first and second mirrors. A gain-element is located in the laser resonator. An arrangement is provided for optically pumping the gain-element, the optical pumping causing fundamental radiation to circulate in the laser-resonator. The laser resonator is folded by a plurality of fold-mirrors on which the circulating radiation is incident a non-normal angle of incidence. Selected ones of the fold-mirrors are coated with one of a plurality of multilayer coating designs, each thereof arranged to impart a predetermined group delay dispersion (GDD) as a function of wavelength to the fundamental radiation incident thereon at a predetermined angle of incidence thereon. The fundamental radiation has a spectrum dependent on the resonator-configuration, the gain-element, and the GDD as a function of wavelength imparted by the selected ones of the fold-mirrors. The GDD as a function of wavelength of each the of the selected ones of the mirrors and the angle of incidence of circulating radiation on each of the selected ones of the fold-mirrors is selected such that the spectrum of the circulating radiation has one of first and second non-Gaussian forms. The first form is characterized by a region of nearly uniform intensity falling to zero on either side of the region. The second form is characterized by at least two intensity peaks having an intensity trough therebetween.

In another aspect of the present invention, the GDD as a function of wavelength of each of the selected ones of the fold-mirrors and the angle of incidence of circulating radiation on each of the selected ones of the fold-mirrors could be selected such that the spectrum of the circulating radiation has an about Gaussian form but are not so selected, and instead are selected such that the spectrum has a non-Gaussian form having a FWHM bandwidth at least about 25% greater than that of the Gaussian form.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
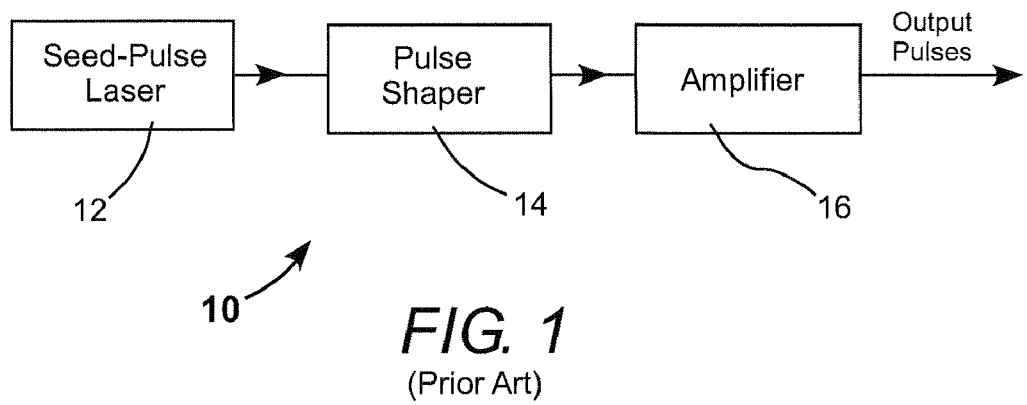
FIG. 1 schematically illustrates in block-diagram form a prior-art ultrafast MOPA system including a seed-pulse generating laser arranged to deliver a pulse having a Gaussian spectrum, a pulse-shaper for amplitude modulating the spectrum of seed-pulse to provide a spectrally amplitude-modulated pulse having a broader spectral bandwidth than that of the seed-pulse, and an amplifier for amplifying the amplitude-modulated seed-pulse.
Figure 2:
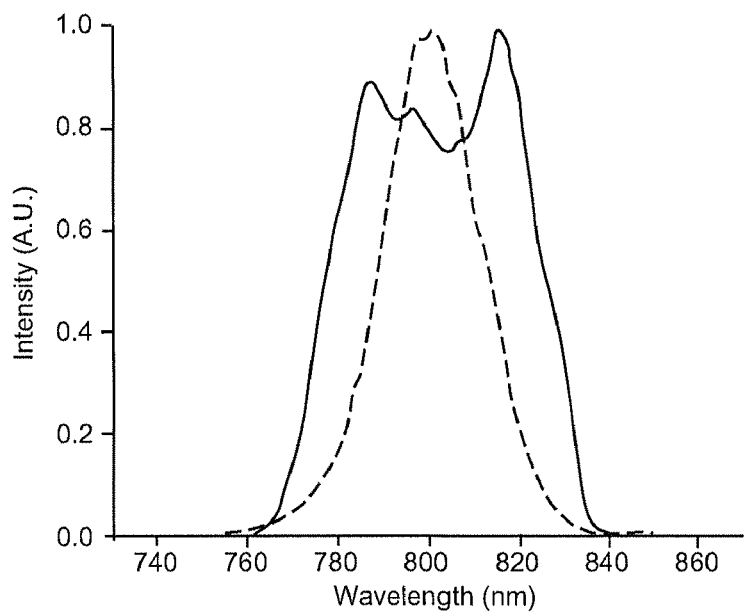
FIG. 2 is a graph schematically illustrating the spectrum (intensity as a function of wavelength) of amplified pulses with and without amplitude modulation by the pulse-shaper of FIG. 1.

Referring now to the drawings, wherein like components are designated by like reference numerals, FIG. 1 schematically illustrates one preferred embodiment 20 of an ultrafast laser in accordance with the present invention. Laser 20 has a multiply folded resonator 21 terminated by a highly reflective (HR) mirror M1 and a partially transmissive outcoupling (OC) mirror M5. The resonator is folded by twelve fold-mirrors. Nine of the fold-mirrors are NGDD mirrors numbered N1 though N9. The remaining three fold-mirrors (and the resonator end-mirrors) are conventional (zero-GDD) mirrors. The zero-GDD fold-mirrors are numbered M2 through M4. Mirrors N1, N2, and N8, are each tiltable as indicated by arrows T and translatable in a direction normal thereto as indicated by arrows D.

A titanium-doped sapphire (Ti:sapphire) gain-element 28 is located between mirrors M2 and M3. The gain element is optically pumped by continuous wave (CW) 532-nm pump light P delivered by a laser 22. The pump light is directed from the laser to the gain-element by mirrors 24 and 26. In response to the optical pumping, fundamental radiation F circulates in the resonator. Kerr-lens modelocking in the resonator provides that the fundamental radiation circulates in mode-locked pulses.

Kerr lens mode-locking in laser 20 is so-called "soft aperture" Kerr lens mode-locking, with the soft aperture defined by the pump-light mode in gain-element 28. Mirrors M1 through M4 and N1 through N9 are all coated for maximum reflectivity over a wavelength range from 700 nm to 900 nm. Mirror M3 is additionally transparent to the wavelength of pump light P. Outcoupling mirror M5 has a reflectivity of about 90% over the wavelength range from 700 nm to 900 nm.

Figure 3:
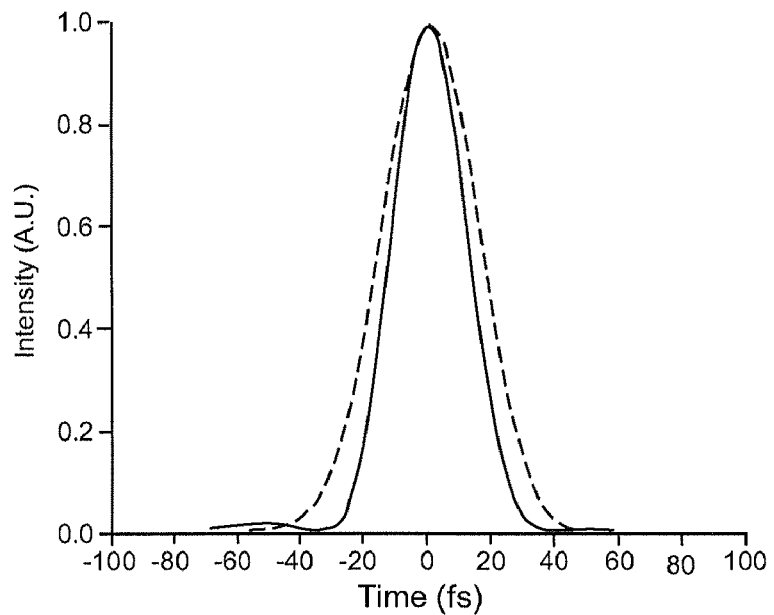
FIG. 3 is a graph schematically illustrating intensity as a function of time for the pulses of FIG. 2.
Figure 5:
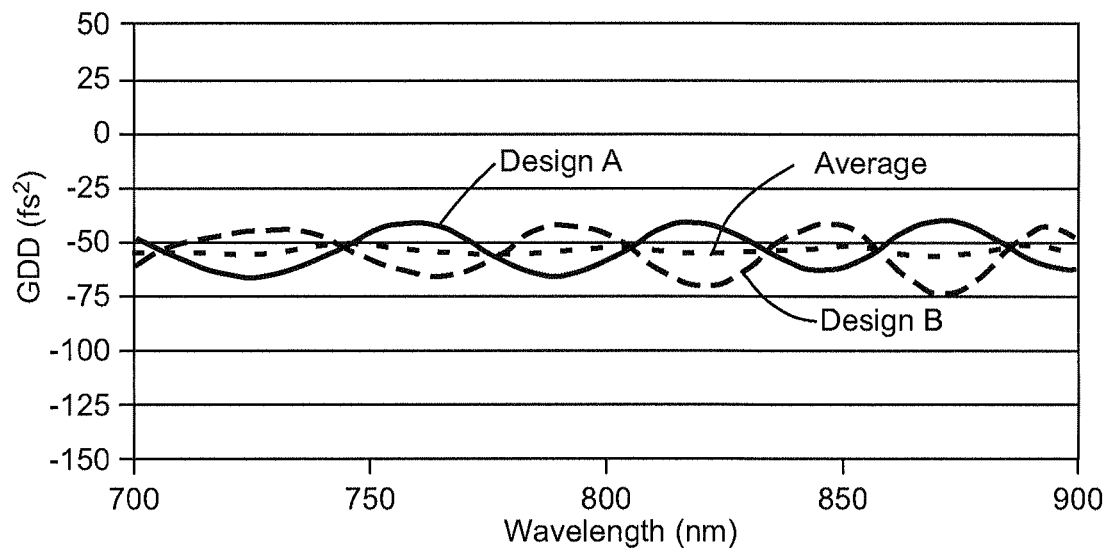
FIG. 5 is a graph schematically illustrates calculated group delay dispersion as a function of wavelength at normal incidence for the coating configurations of FIG. 4.

Only two basic NGDD coatings designs are used for the NGDD mirrors. The coatings are designed to provide a mirror with a GDD of about −55 femtoseconds squared ($fs^2$) over a wavelength range from about 700 nm to about 900 nm at normal incidence, i.e., for light incident at 0.0° to a normal to the mirror. The calculated GGD as a function of wavelength for the two designs (design A and design B) is schematically depicted in FIG. 5. It can be seen that over this extended wavelength range the GDD fluctuates (ripples) about the desired GDD between limits of about −40 and −75 $fs^2$. Design A has fluctuation (ripple) maxima at wavelengths of about 760 nm, about 820 nm, and about 875 nm, with fluctuation minima therebetween. Design B has fluctuation maxima at about 730 nm, about 790 nm, about 850 nm, and about 890 nm, with fluctuation minima therebetween. The positions of the fluctuation maxima and minima are arranged such that the ripples of one are about "out of phase" with the ripples of the other. This provides that a pair of mirrors, one coated with design A and other with design B can provide and in effect an average GDD that has minimized ripple (see dotted curve in FIG. 3). It should be noted that the aggregate GDD imparted by the pair would be about −110 $fs^2$.

Figure 6:
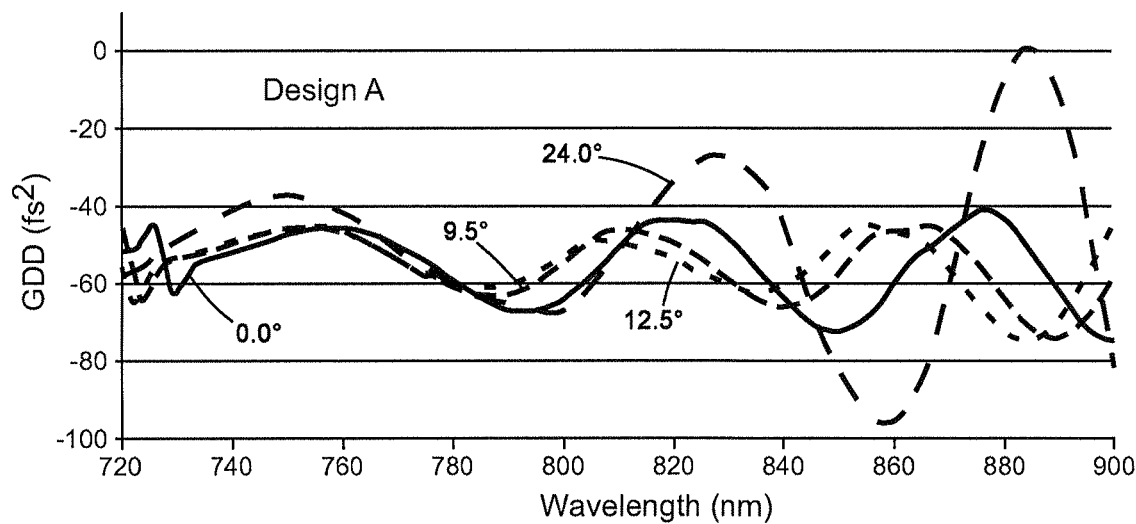
FIG. 6 is a graph schematically illustrates measured group delay dispersion as a function of wavelength at normal incidence for one of the coating configurations of FIG. 4 at various angles of incidence.
Figure 7:
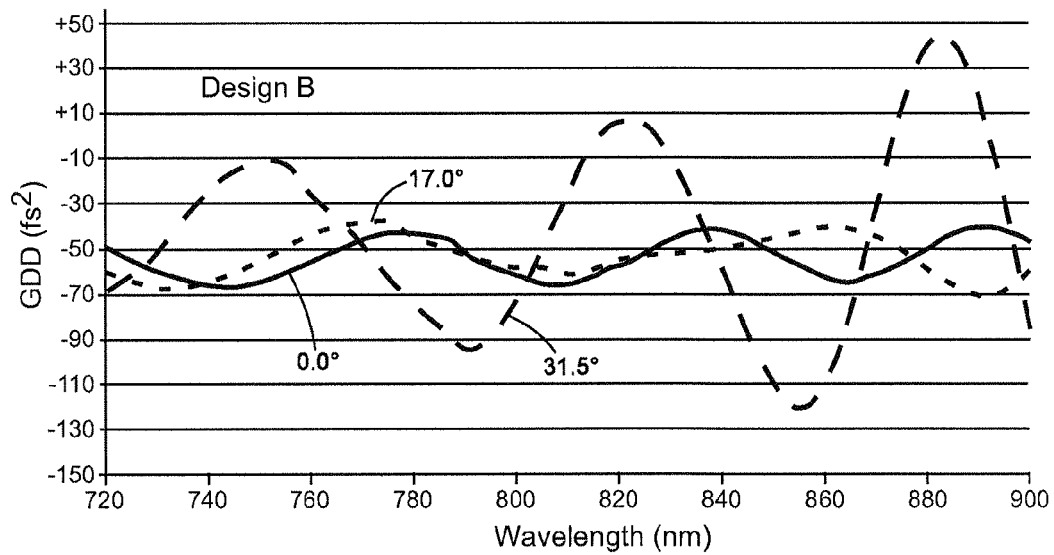
FIG. 7 is a graph schematically illustrates measured group delay dispersion as a function of wavelength at normal incidence for the other of the coating configurations of FIG. 4 at various angles of incidence.

FIG. 6 schematically depicts the measured GDD as a function of wavelength for an example of design A at a range of angles of incidence up to 24° incidence. FIG. 7 schematically depicts the measured GGD as a function of wavelength for an example of design B at a range of angles of incidence up to 31.5° incidence. It can be seen in each case that the magnitude of ripple in the GDD is about the same as at normal incidence except for the largest incidence angle. In each case, the ripples shift to longer wavelengths with increasing incidence angle.

Principles of GDD mirror design are described in detail in U.S. Pat. Nos. 6,081,379 and 6,154,138, each assigned to the assignee of the present invention, and the complete disclosure of which is hereby incorporated herein by reference. Software is commercially available from more than one supplier that will enable NGGD coatings to be automatically designed according to the principles described. Further, NGDD coatings are commercially available from more than one commercial supplier of optical coatings.

Figure 4:
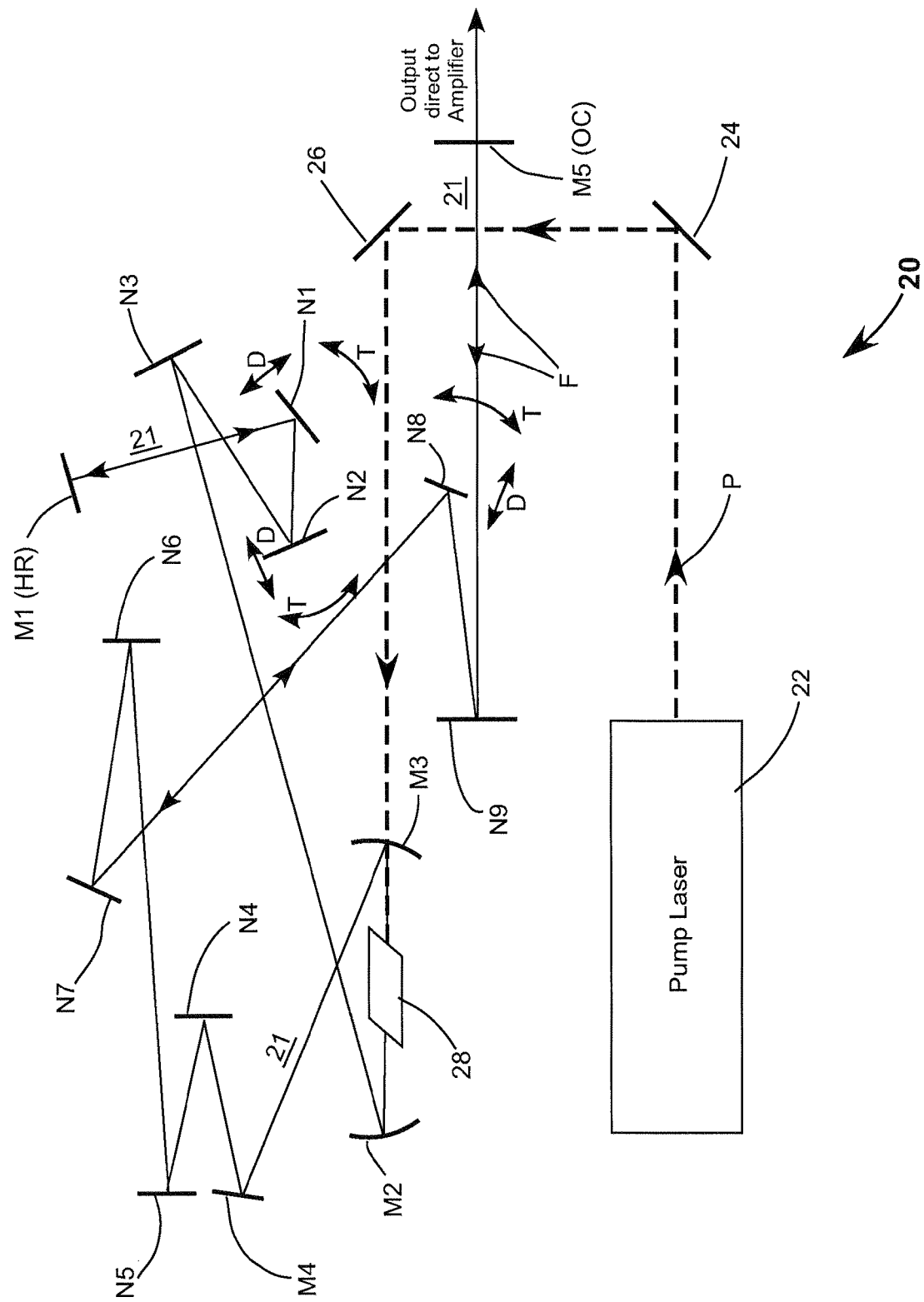
FIG. 4 schematically illustrates one embodiment of a laser in a accordance with the present invention including a plurality of mirrors each thereof coated with one of two multilayer coatings configured such that each mirror has a group delay dispersion of about −55 $fs^2$ in a wavelength range between about 700 nm and 900 nm at normal incidence.
Figure 8:
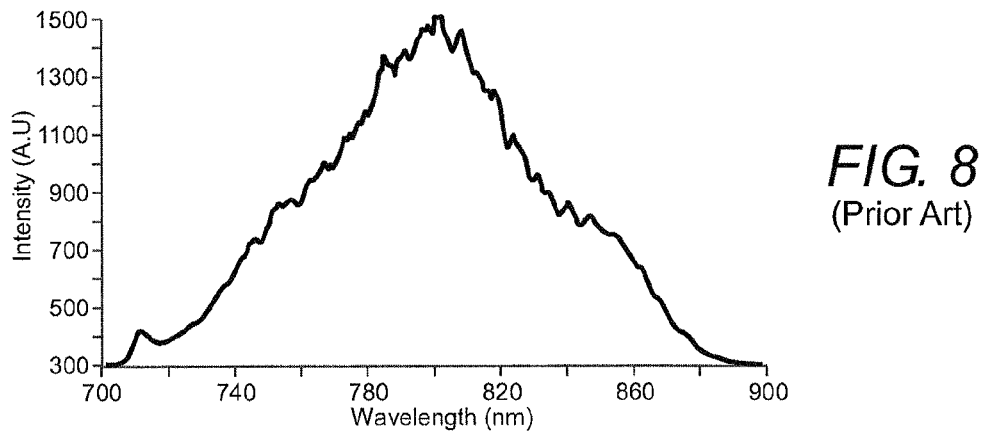
FIG. 8 schematically illustrates the measured spectrum of a pulse produced by the laser of FIG. 4 when the coating configurations are assigned to the mirrors of the laser of FIG. 4 such that a pulse delivered has a near-Gaussian spectrum similar to that provided by the prior-art laser of FIG. 1.

Continuing now with reference again to FIG. 4, the layout of laser 20 is similar to that of a Mantis™ laser available from Coherent Inc. of Santa Clara, Calif. In an original version of this laser, the coating designs and angles of incidence for the NGDD mirror were selected to minimize total ripple in aggregate GDD provided by the mirror, in accordance with prior-art principles, such that the laser provided an output pulse with an near Gaussian spectrum. In this prior-art version, the angles of incidence on mirrors N1, N2, N3, N4, N5, N6, N7, N8, and N9 are respectively 31.5°, 24.0°, 14.5°, 12.5°, 12.5°, 4.0°, 17.0°, 24.0°, and 4.0°. The coating designs on the mirrors are respectively A, B, A, B, B, A, A, B, and A. The measured spectrum of a pulse delivered by this prior-art version laser is schematically depicted in FIG. 8. The spectrum has a FWHM bandwidth of about 68.0 nm.

In an experiment to determine the effect of a significant perturbation of the total GDD provided by the NGDD mirrors it was decided to make such a perturbation by using one or more mirrors that had been placed along the resonator at locations oriented at high angles of incidence and swapping them for mirrors that been used in positions along the resonator oriented at much lower angles of incidence. Accordingly, in one example of an inventive version of laser 20, mirrors N3-N7 had coating designs at angle of incidence above-specified. Coating designs for mirror N1 and N2, and N8 and N9, however were interchanged such that mirrors N1 and N2 at respectively 31.5° and 24.0° incidence had coating designs respectively B and A, and mirrors N8 and N9 at respectively 24.0° and 4.0° incidence had coating designs respectively A and B.

Figure 9:
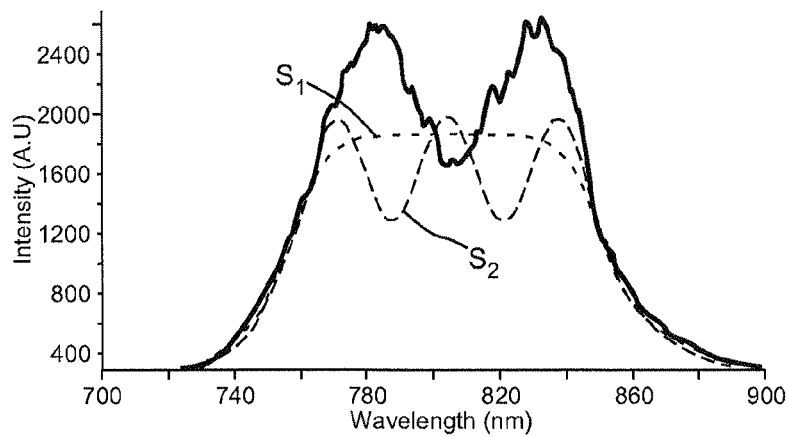
FIG. 9 schematically illustrates the measured spectrum of a pulse produced by the laser of FIG. 4 when the coating configurations are assigned to the mirrors of the laser of FIG. 4 such that a pulse delivered has a spectrum including two intensity peaks with an intensity trough therebetween and having a FWHM bandwidth at least about 25% greater that that of the spectrum of FIG. 8.

The measured spectrum of a pulse produced by this experimental laser is schematically depicted in FIG. 9 as a bold solid curve. It can be seen that as the result of this simple interchange, the spectrum has the form of two intensity peaks having an intensity trough therebetween, i.e., generally of the form that is indicated in the above-discussed Pastirk et al. paper as being a preferred form for a pulse to be amplified.

Those skilled in the art will recognize from the description given above that the spectral form of FIG. 9, being created by using NGDD mirrors immediately available is not the only spectral-shaping form that could be produced by providing a laser with NGDD mirrors providing an aggregate GDD with intentionally-introduced higher-order ripples. Indeed, those encouraged by the discovery described herein, and being possessed of sufficient patience and computing power, may devise GDD specifications for mirrors that could result in a number of different pulse-spectrum shapes without departing from the spirit and scope of the present invention.

Further it is probable that a pulse spectral form of two intensity peaks having an intensity trough therebetween is not the only form advantageous for further amplification. The spectral form may be a form having a central extended spectral range of about uniform intensity, i.e., near a super-Gaussian ($e^{-x^{2N}}$, where N is an integer two or greater and is the order of the super-Gaussian) of order two or greater, such as depicted in FIG. 9 by dotted curve $S_1$ (which approximates a third-order super-Gaussian). The spectral form may also be a form having three intensity peaks and two intensity troughs, as depicted in FIG. 9 by dashed-curve $S_2$. All of the spectral forms can be characterized as having a FWHM spectral bandwidth at least about 25% greater than the FWHM bandwidth of a Gaussian-shaped pulse spectrum produced by the same laser. Such a spectral shape could be beneficial in some applications including pumping an optical parametric amplifier (OPA) or an optical parametric chirped-pulse amplifier (OPCPA).

It should be noted here that while the present disclosure has been limited to a soft-aperture Kerr lens mode-locked, Ti:sapphire laser having a resonator with twelve fold-mirrors, nine of which are NGDD mirrors, the invention is not limited to that particular laser. The invention is applicable in a laser with more or less fold-mirrors, or more or less NGDD mirrors, with hard aperture or soft aperture Kerr lens mode-locking, and with a different gain-element material. Other possible gain-element materials include titanium-doped chrysoberyl, chromium-doped forsterite, chromium-doped alexandrite, or chromium-doped lithium strontium aluminum fluoride (LISAF). Pumping wavelengths are selected according to the particular gain-element as is known in the art.

In summary, the present invention is described above in terms of a preferred and other embodiments. The invention is not limited, however, to the embodiments described and depicted. Rather, the invention is limited only by the claims appended hereto.

What is claimed is:

1. A laser comprising:
   a laser resonator terminated by first and second mirrors;
   a gain-element located in the laser resonator;
   an arrangement for optically pumping the gain-element, the optical pumping causing fundamental radiation to circulate in the laser-resonator;
   the laser resonator being folded by a plurality of fold-mirrors on which the circulating radiation is incident at a non-normal angle of incidence, selected ones of the fold-mirrors being coated with one of a plurality of multilayer coating designs, each thereof arranged to impart a predetermined group delay dispersion (GDD) as a function of wavelength to the fundamental radiation incident thereon at a predetermined angle of incidence thereon, the fundamental radiation having a spectrum dependent on the resonator configuration, the gain-element, and the GDD imparted by each of the selected ones of the fold-mirrors; and
   wherein the GDD as a function of wavelength of each of the selected ones of the fold-mirrors and the angle of incidence of circulating radiation on each of the selected ones of the fold-mirrors are selected such that the spectrum of the circulating radiation has one of first and second non-Gaussian forms, the first form characterized as having one of a region of about uniform intensity with intensity falling to zero on either side of the region, and the second form characterized as having at least two intensity peaks with an intensity trough therebetween.

2. The laser of claim 1, wherein the GDD as a function of wavelength of each of the selected ones of the fold-mirrors and the angle of incidence of circulating radiation on each of the selected ones of the fold-mirrors could be selected such that the spectrum of the circulating radiation had an about Gaussian form, but are not so selected, and wherein the non-Gaussian forms of the spectrum of the circulating radiation have a FWHM bandwidth at least about 25% greater than the about Gaussian form.

3. The laser of claim 1, wherein the spectrum of the circulating radiation is of the first form.

4. The laser of claim 3, wherein the spectrum of the circulating radiation approximates a super-Gaussian of order two or greater.

5. The laser of claim 1, wherein the spectrum of the circulating radiation is of the second form and has only two intensity peaks having an intensity trough therebetween.

6. The laser of claim 1, wherein the gain-element is a Ti:sapphire gain-element.

7. The laser of claim 6, wherein there are twelve fold mirrors, nine of which are coated with one of the plurality of GDD-imparting multilayer coating designs.

8. The laser of claim 7, wherein there are first and second GDD-imparting multilayer coating designs, each thereof designed to provide a nominal GDD of about −55 femtoseconds squared, at normal incidence, in a wavelength range between about 900 nm, wherein the GDD in each thereof fluctuates about the nominal value between maximum and minimum values of about −40 femtoseconds squared and −75 femtoseconds squared respectively, and wherein the first design has fluctuation maxima at wavelengths of about 760 nm, about 820 nm, and about 875 nm, and the second design has fluctuation maxima at about 730 nm, about 790 nm, about 850 nm, and about 890 nm.

9. The laser of claim 8 wherein the angles of incidence first thorough the ninth GDD-imparting mirrors are respectively 31.5°, 24.0°, 14.5°, 12.5°, 12.5°, 4.0°, 17.0°, 24.0°, and 4.0°, and wherein the designs on the mirrors are respectively the second, first, first, second, second, first, first, first, and second.

10. The laser of claim 9, wherein the spectrum of circulating radiation has only two intensity peaks with an intensity trough therebetween.

11. A laser comprising:
a laser resonator terminated by first and second mirrors;
a gain-element located in the laser resonator;
an arrangement for optically pumping the gain-element, the optical pumping causing fundamental radiation to circulate in the laser-resonator;
the laser resonator being folded by a first plurality of fold-mirrors on which the circulating radiation is incident at a non-normal angle of incidence, selected ones of the fold-minors being coated with one of a plurality of multilayer coating designs, each thereof arranged to impart a predetermined group delay dispersion (GDD) as a function of wavelength to the fundamental radiation incident thereon at a predetermined angle of incidence thereon, the fundamental radiation having a spectrum dependent on the resonator configuration, the gain-element and the GDD imparted by each of the selected ones of the fold-minors; and
wherein the GDD as a function of wavelength of each of the selected ones of the fold-minors and the angle of incidence of circulating radiation on each of the selected ones of the fold-minors could be selected such that the spectrum of the circulating radiation had an about Gaussian form, but are not so selected, and are instead selected such that the spectrum of the circulating radiation has a non-Gaussian form having a FWHM bandwidth at least about 25% greater than the about Gaussian form.

12. The laser of claim 11, wherein the spectrum of the circulating radiation has one of first and second non-Gaussian forms, the first form characterized as having one of a region of about uniform intensity with intensity falling to zero on either side of the region, and the second form characterized as having at least two intensity peaks with an intensity trough therebetween.

13. The laser of claim 12, wherein the spectrum of the circulating radiation is of the first form.

14. The laser of claim 13, wherein the spectrum of the circulating radiation approximates a super-Gaussian of order two or greater.

15. The laser of claim 11, wherein the spectrum of the circulating radiation has only two intensity peaks having an intensity trough therebetween.

16. The laser of claim 11, wherein the gain-element is a Ti:sapphire gain-element.

17. The laser of claim 16, wherein there are twelve fold mirrors, nine of which are coated with one of the plurality of GDD-imparting multilayer coating designs.

18. The laser of claim 17, wherein there are first and second GDD-imparting multilayer coating designs, each thereof designed to provide a nominal GDD of about −55 femtoseconds squared, at normal incidence, in a wavelength range between about 900 nm, wherein the GDD in each thereof fluctuates about the nominal value between maximum and minimum values of about −40 femtoseconds squared and −75 femtoseconds squared respectively, and wherein the first design has fluctuation maxima at wavelengths of about 760 nm, about 820 nm, and about 875 nm, and the second design has fluctuation maxima at about 730 nm, about 790 nm, about 850 nm, and about 890 nm.

19. The laser of claim 18, wherein the angles of incidence first thorough the ninth GDD-imparting mirrors are respectively 31.5°, 24.0°, 14.5°, 12.5°, 12.5°, 4.0°, 17.0°, 24.0°, and 4.0°, and wherein the designs on the mirrors are respectively the second, first, first, second, second, first, first, first, and second.

20. The laser of claim 19, wherein the spectrum of the circulating radiation includes two intensity peaks having an intensity trough therebetween.

21. A laser comprising:
a laser resonator terminated by first and second mirrors;
a gain-element located in the laser resonator;
an arrangement for optically pumping the gain-element, the optical pumping causing fundamental radiation to circulate in the laser-resonator;
the laser resonator being folded by a plurality of fold-mirrors on which the circulating radiation is incident at a non-normal angle of incidence, selected ones of the fold-mirrors being coated with one of a plurality of multilayer coating designs, each thereof arranged to impart a predetermined group delay dispersion (GDD) as a function of wavelength to the fundamental radiation incident thereon at a predetermined angle of incidence thereon, the fundamental radiation having a spectrum dependent on the resonator configuration, the gain-element, and the GDD imparted by each of the selected ones of the fold-mirrors; and
wherein the GDD as a function of wavelength of each of the selected ones of the fold-mirror and the angle of incidence of circulating radiation on each of the selected ones of the fold-mirrors are selected such that the spectrum of the circulating radiation has at least two intensity peaks with an intensity trough therebetween.

* * * * *